United States Patent
Gilbreath et al.

(10) Patent No.: US 10,704,723 B2
(45) Date of Patent: Jul. 7, 2020

(54) QUICK DISCONNECT COUPLING

(71) Applicant: GATES CORPORATION, Denver, CO (US)

(72) Inventors: Donald R. Gilbreath, Castle Rock, CO (US); Charles C. Gray, Parker, CO (US)

(73) Assignee: Gates Corporation, Denver, CO (US)

( * ) Notice: Subject to any disclaimer, the term of this patent is extended or adjusted under 35 U.S.C. 154(b) by 204 days.

(21) Appl. No.: 15/710,534

(22) Filed: Sep. 20, 2017

(65) Prior Publication Data

US 2019/0086012 A1     Mar. 21, 2019

(51) Int. Cl.
| | |
|---|---|
| *F16L 37/113* | (2006.01) |
| *F16L 37/12* | (2006.01) |
| *F16L 19/025* | (2006.01) |
| *F16L 19/00* | (2006.01) |
| *F16L 15/00* | (2006.01) |

(52) U.S. Cl.
CPC ......... *F16L 37/1215* (2013.01); *F16L 19/025* (2013.01); *F16L 37/113* (2013.01); *F16L 15/008* (2013.01); *F16L 19/005* (2013.01); *F16L 2201/10* (2013.01); *F16L 2201/20* (2013.01)

(58) Field of Classification Search
CPC ....... F16L 37/107; F16L 37/113; F16L 37/24; F16L 37/252; F16L 37/248
USPC ........................................ 285/353, 360, 361
See application file for complete search history.

(56) References Cited

U.S. PATENT DOCUMENTS

| | | | | |
|---|---|---|---|---|
| 980,677 | A * | 1/1911 | Rhoads ................. | F16L 37/252 285/86 |
| 1,039,536 | A * | 9/1912 | Hill ....................... | F16L 37/252 285/86 |
| 1,673,338 | A * | 6/1928 | Mitchell ................ | F16L 37/24 285/86 |
| 1,739,131 | A | 12/1929 | Van N. Eick | |
| 1,761,352 | A * | 6/1930 | Logan ................... | F16L 37/252 285/86 |
| 1,778,739 | A * | 10/1930 | Wheaton ............... | F16L 37/113 285/82 |

(Continued)

FOREIGN PATENT DOCUMENTS

| | | |
|---|---|---|
| CN | 103775772 A | 5/2014 |
| DE | 20313792 U1 | 12/2003 |

(Continued)

OTHER PUBLICATIONS

European Patent Office, International Search Report and Written Opinion of the International Searching Authority, application No. PCT/US2018/050274; dated Nov. 30, 2018.

*Primary Examiner* — David Bochna
(74) *Attorney, Agent, or Firm* — Paul N. Dunlap, Esq.

(57) ABSTRACT

A quick disconnect coupling for connecting a tube to another structure, such as a structure defining a port. The quick disconnect coupling may include a tube including a retention shoulder, a swivel rotatably disposed on the tube, and an adapter defining a bore for receiving a portion of the tube. The swivel may be engageable with the adapter to trap the retention shoulder between the swivel and the adapter. The adapter may be engageable with a receiving structure defining a port and the port may be in fluid communication with a lumen of the tube when the swivel is engaged with the adapter.

15 Claims, 11 Drawing Sheets

(56) References Cited

U.S. PATENT DOCUMENTS

| | | | | |
|---|---|---|---|---|
| 1,830,973 A | * | 11/1931 | Wheaton | F16L 37/113 285/362 |
| 1,997,858 A | * | 4/1935 | Clawson | F16L 37/113 285/362 |
| 2,428,077 A | * | 9/1947 | Herold | F16L 37/252 285/89 |
| 2,806,717 A | * | 9/1957 | Hempel | F16L 37/252 285/5 |
| 3,254,673 A | | 6/1966 | MacKenzie | |
| 3,319,690 A | | 5/1967 | Jose Rosan et al. | |
| 3,537,730 A | * | 11/1970 | Kresin | F16L 37/113 285/86 |
| 3,583,667 A | * | 6/1971 | Amneus, Jr. | F16L 37/113 251/149.5 |
| 3,583,731 A | * | 6/1971 | Jewell | F16L 37/252 285/85 |
| 4,662,654 A | * | 5/1987 | Marshall | B25B 13/48 279/134 |
| 5,280,876 A | * | 1/1994 | Atkins | F16L 37/113 251/144 |
| 5,580,099 A | | 12/1996 | Eaton | |
| 5,681,058 A | * | 10/1997 | Hwang | F16L 19/048 285/133.4 |
| 6,704,946 B1 | * | 3/2004 | Mueller | E03C 1/023 137/118.02 |
| 2002/0170990 A1 | | 11/2002 | Anderson et al. | |
| 2012/0104744 A1 | | 5/2012 | Petty | |
| 2015/0000096 A1 | | 1/2015 | Gilbreath | |
| 2015/0260325 A1 | | 9/2015 | Quick | |
| 2015/0316185 A1 | | 11/2015 | Mullin | |
| 2017/0276279 A1 | * | 9/2017 | Mowdy | B67C 3/26 |

FOREIGN PATENT DOCUMENTS

| | | | | |
|---|---|---|---|---|
| DE | 102005044751 A1 | 4/2006 | | |
| EP | 2894381 A1 | 7/2015 | | |
| FR | 2784735 B1 | 12/2000 | | |
| WO | WO-2005059425 A1 | * | 6/2005 | F16L 37/113 |
| WO | WO-2006077691 A1 | * | 7/2006 | F16L 37/113 |

* cited by examiner

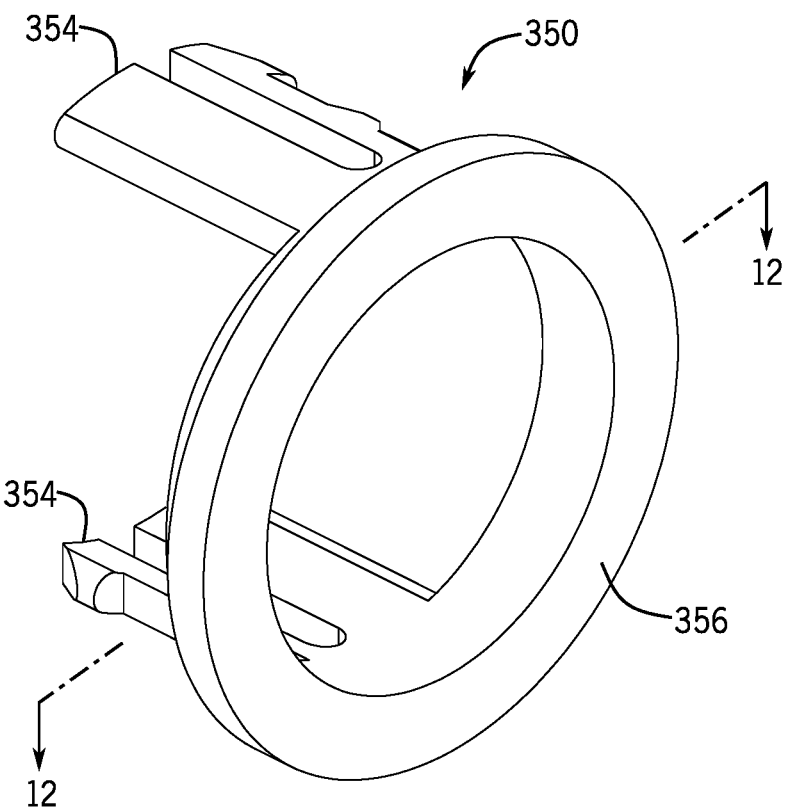
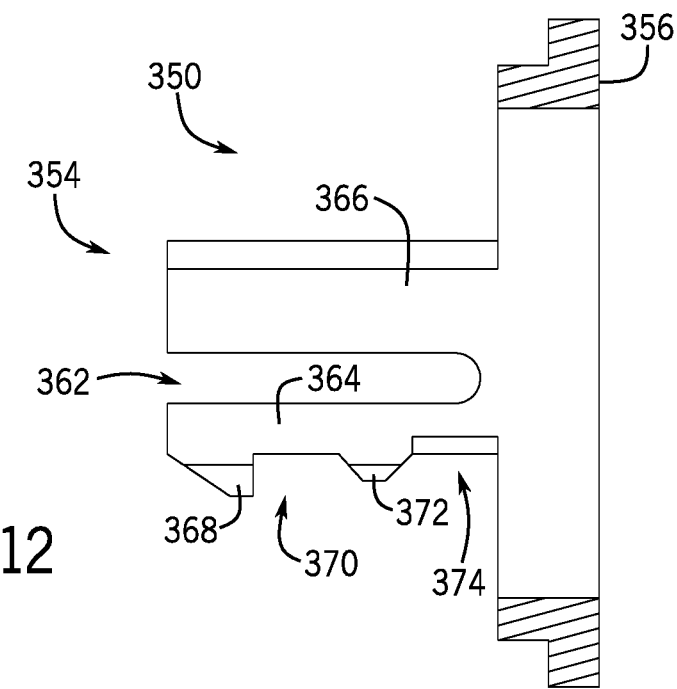

QUICK DISCONNECT COUPLING

BACKGROUND

Field

This disclosure relates generally to couplings, and more particularly to a quick disconnect coupling for connecting a tube to another structure, such as structure defining a port.

Related Art

Couplings are commonly used in fluid power and other applications to couple together various types of hoses, tubing, pipe, manifolds, and other suitable structures. Existing couplings may be difficult to connect, may leak during use, and may be difficult to determine whether they are properly connected together. They also may require special tools to connect such as torque wrenches, which slow the connection process. Further, existing couplings may be difficult to disconnect or remove from the structure to which they are attached due to various factors including debris, corrosion, and mechanical interference between the components.

SUMMARY

The present disclosure is generally directed to couplings. Examples of the disclosure may include a quick disconnect coupling. The coupling may include a tube, a swivel rotatably disposed on the tube, and an adapter defining a bore for receiving the tube. The tube may include a retention shoulder, and the swivel may be retained on the tube by the retention shoulder. The swivel may include at least one tab projecting outwardly of the retention shoulder. The adapter may include an internal flange dimensioned to allow passage of the retention shoulder and selective passage of the at least one tab depending on a rotational orientation of the swivel, wherein in a first rotational orientation of the swivel relative to the adapter the internal flange may allow passage of the at least one tab, and wherein upon passage of the at least one tab the swivel may be rotated relative to the adapter to a second rotational orientation in which the swivel and the adapter are engaged together.

In another example, a quick disconnect coupling may include a tube including a retention shoulder, a swivel rotatably disposed on the tube and retained on the tube by the retention shoulder, and an adapter defining a bore for receiving the tube. The swivel may include an external thread projecting outwardly of the retention shoulder. The adapter may include an internal thread dimensioned to threadedly engage the external thread of the swivel. The retention shoulder may be captured between the swivel and the adapter when the swivel and the adapter are threadedly engaged.

In another example, a method of connecting a tube to a structure defining a port is provided. The method may include abutting a swivel rotatably disposed on a tube against a retention shoulder formed on the tube, inserting a portion of the tube into an adapter such that the retention shoulder is positioned between the swivel and the adapter, and engaging the swivel with the adapter by rotating the swivel relative to the adapter to capture the retention shoulder between the swivel and the adapter.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and form part of the specification in which like numerals designate like parts, illustrate examples of the present disclosure and together with the description, serve to explain the principles of the disclosure.

FIG. 11 is an isometric view of an example lock member.

FIG. 12 is a section view of the lock member of FIG. 11.

DETAILED DESCRIPTION

This disclosure generally relates to a quick disconnect coupling. The coupling may include a swivel rotatably disposed on a tube and an adapter coupled to a receiving structure defining a port. The swivel and the adapter may include corresponding engagement features for being attached together to secure the tube to the receiving structure. FIGS. 1-12 generally relate to a quarter-turn quick disconnect coupling. FIGS. 13-17 generally relate to a threaded quick disconnect coupling.

Figure 1:
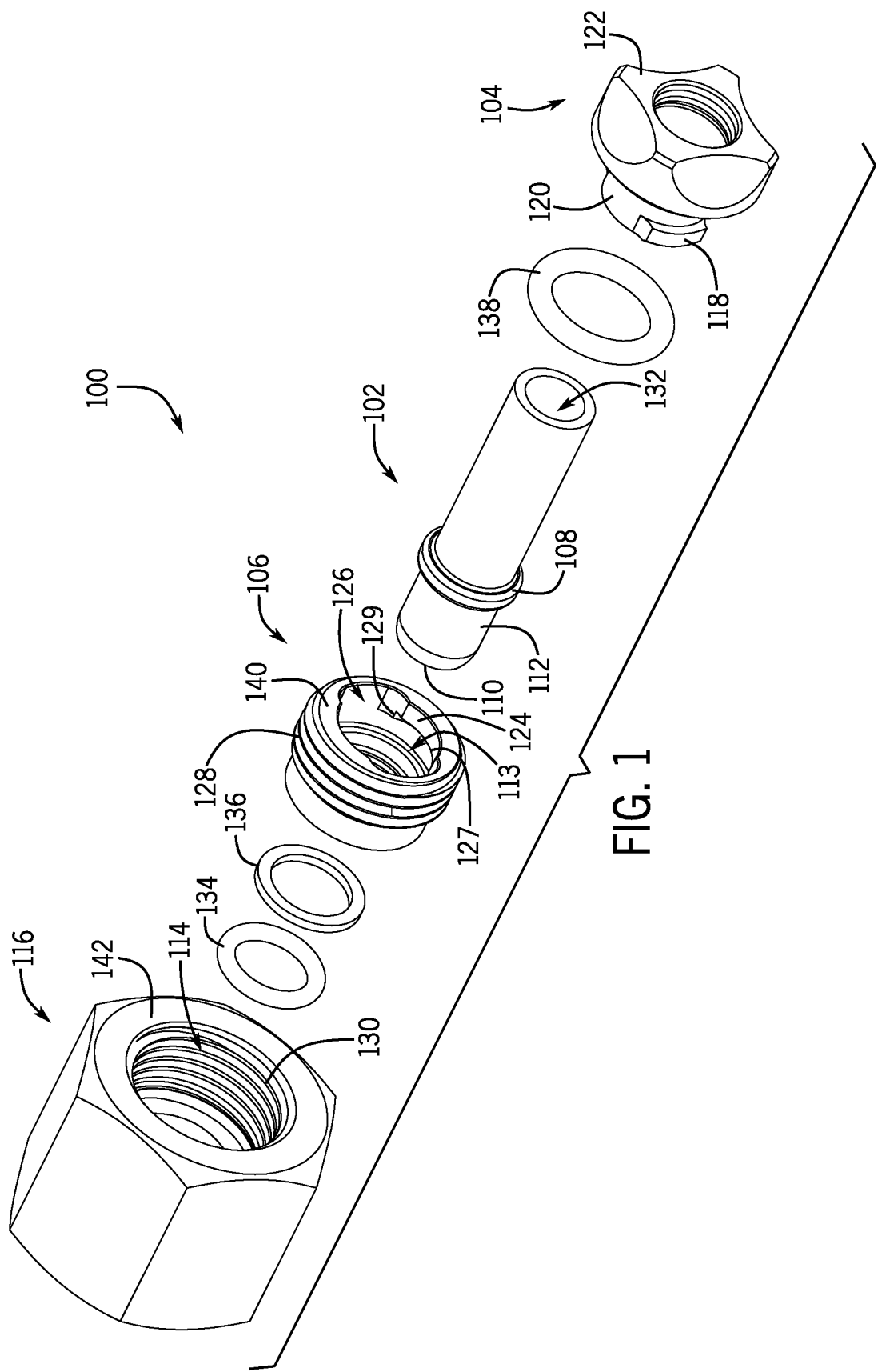
FIG. 1 is an exploded view of an example quick disconnect coupling.

A quick disconnect coupling 100 is shown in FIG. 1. The coupling 100 may include a tube 102, a swivel 104, and an adapter 106. The swivel 104 may be rotatably disposed on the tube 102 such that the swivel 104 is rotatable relative to the tube 102, and the swivel 104 may be retained on the tube 102 by a retention shoulder 108 of the tube 102. The swivel 104 may be attached to the adapter 106 to axially secure the retention shoulder 108 of the tube 102 between the swivel 104 and the adapter 106.

The retention shoulder 108 may extend annularly around a periphery of the tube 102 and may be offset from an end 110 of the tube 102. In some implementations, the retention shoulder 108 is integrally formed (e.g., monolithically formed) with the tube 102 as a unitary structure. In some implementations, the retention shoulder 108 comprises a separate component, such as a retaining clip, that is secured to the tube 102 such that the separate component is fixed in an axial direction relative to the tube 102. An outer surface 112 of the tube 102 may extend between the retention shoulder 108 and the end 110 of the tube 102 and may be at least partially received in a bore 113 of the adapter 106 when the swivel 104 is attached to the adapter 106. The outer surface 112 may be cylindrical and may be tapered proximate the end 110 of the tube 102 to facilitate insertion of the tube 102 into a port 114 defined by a receiving structure 116, such as a female connector, a manifold, or any other suitable receiving structure.

The swivel 104 may include an engagement feature for quick connection of the swivel 104 to the adapter 106. For example, the swivel 104 may include at least one tab 118 that engages the adapter 106 to connect the swivel 104 to the adapter 106. The at least one tab 118 may be formed on a stem 120 of the swivel 104. The swivel 104 may include a head 122 to which the stem 120 is connected, and the at least one tab 118 may be formed near an end of the stem 120 distal of the head 122. The swivel 104 may be hand tightened by applying torque to the head 122 of the swivel 104.

The adapter 106 may include an engagement feature for quick connection of the swivel 104 to the adapter 106. For example, adapter 106 may include an internal flange 124 that engages the at least one tab 118 of the swivel 104 to connect the swivel 104 to the adapter 106. The internal flange 124 may be dimensioned to allow passage of the retention shoulder 108 of the tube 102 and selective passage of the at least one tab 118 depending on the rotational orientation of the swivel 104 relative to the adapter 106. For example, in a first rotational orientation of the swivel 104 relative to the adapter 106 the internal flange 124 may allow passage of the at least one tab 118. The internal flange 124 may define at least one recess 126 dimensioned to allow passage of the at least one tab 118 when the at least one tab 118 is aligned with the at least one recess 126. Upon passage of the at least one tab 118 past the internal flange 124, the swivel 104 may be rotatable in a first direction relative to the adapter 106 to engage the swivel 104 and the adapter 106 together. During rotation of the swivel 104 relative to the adapter 106, the at least one tab 118 may move along a path 125, such as a groove, defined aft of the internal flange 124 (see FIG. 3). In some embodiments, the at least one tab 118 may contact a stop feature of the adapter 106 to inhibit further rotation of the swivel 104 in the first direction relative to the adapter 106. For example, in some implementations, the depth of the path 125 (e.g., groove) may be decreased at a predefined location along its length, thereby forming a stop feature that inhibits further rotation of the at least one tab 118 in the first direction along the path.

The adapter 106 may be configured to resist inadvertent disconnection of the swivel 104 from the adapter 106. For example, in a second rotational orientation of the swivel 104 in which the swivel 104 is engaged with the adapter 106, the internal flange 124 may inhibit removal of the at least one tab 118 from the adapter 106. The internal flange 124 may include a locking feature that inhibits rotation of the swivel 104 in a second direction opposite the first direction when the swivel 104 is in the second rotational orientation. As illustrated in FIG. 1, a seat 127 may be defined in the internal flange 124, and the seat 127 may be dimensioned to receive a respective tab 118 when the swivel 104 is in the second rotational orientation. The seat 127 may be formed as an indentation or step in an inner surface of the internal flange 124. A stop shoulder 129 may be formed between the seat 127 and a respective recess 126 to inhibit rotation of the respective tab 118 in the second direction relative to the adapter 106. The stop shoulder 129 may resist inadvertent disconnection of the swivel 104 from the adapter 106. As further discussed below, the at least one tab 118 may be biased into the seat 127 to ensure the stop shoulder 129 engages the at least one tab 118 to resist inadvertent disconnection of the swivel 104 from the adapter 106.

The adapter 106 may be positionable at least partially within the port 114 of the receiving structure 116 and connectable to the receiving structure 116. To connect the adapter 106 to the receiving structure 116, the adapter 106 may be threadedly engaged with the receiving structure 116. For example, the adapter 106 may include an external thread 128 that is engageable with an internal thread 130 of the receiving structure 116 to connect the adapter 106 to the receiving structure 116. When the adapter 106 is connected with the receiving structure 116, an end face 140 of the adapter 106 may be substantially flush with or recessed relative to an end face 142 of the receiving structure 116.

The coupling 100 may include a sealing feature for preventing leakage of fluid flowing between a lumen 132 of the tube 102 and the port 114 of the receiving structure 116. For example, an elastomeric sealing element 134 (e.g., an O-ring) may be disposed inside the receiving structure 116 and may be sealingly engaged with the outer surface 112 of the tube 102 to form a fluid-tight interface between the tube 102 and the receiving structure 116. A back-up ring 136 may be disposed inside the receiving structure 116 in abutting relationship with an aft-side of the sealing element 134. The back-up ring 136 may ensure the sealing element 134 remains in its desired location inside the receiving structure 116 during pressurization of the lumen 132 of the tube 102 and the port 114 of the receiving structure 116.

Another sealing feature may be associated with the swivel 104 to keep foreign matter, such as dirt or debris, away from the at least one tab 118 of the swivel 104 and/or out of the threaded engagement between the adapter 106 and the receiving structure 116. For example, an elastomeric sealing element 138 (e.g., an O-ring) may be disposed on the swivel 104, such as about the stem 120 of the swivel 104. The sealing element 138 may form a seal, such as a fluid-tight interface, between the swivel 104 and the end face 142 of the receiving structure 116 to protect the threaded engagement of the adapter 106 and the receiving structure 116, and the at least one tab 118 of the swivel 104, from foreign matter.

Figure 2:
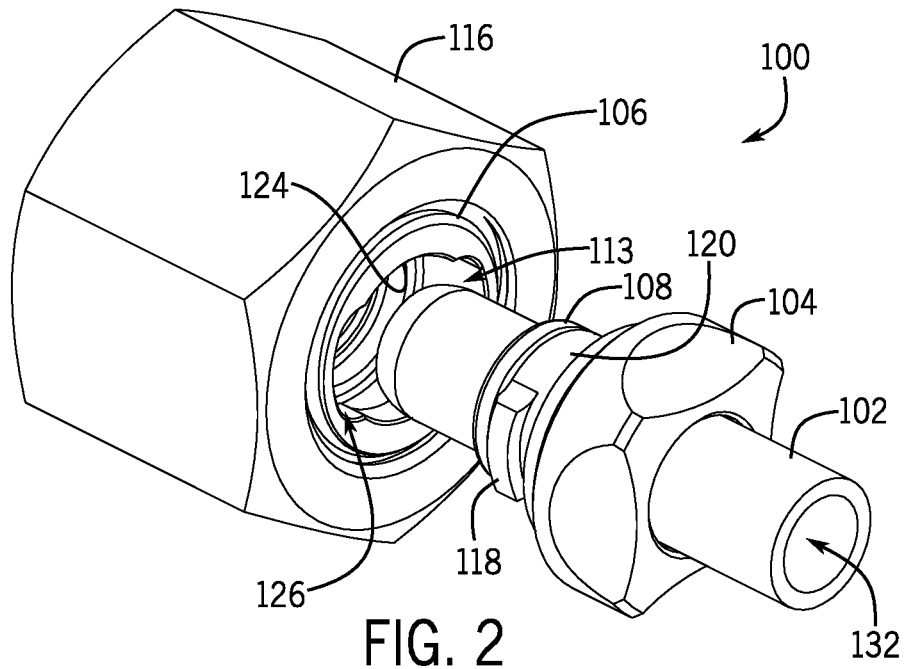
FIG. 2 is a partially exploded view of the quick disconnect coupling of FIG. 1 pre-insertion of a swivel into a bore of an adapter.
Figure 3:
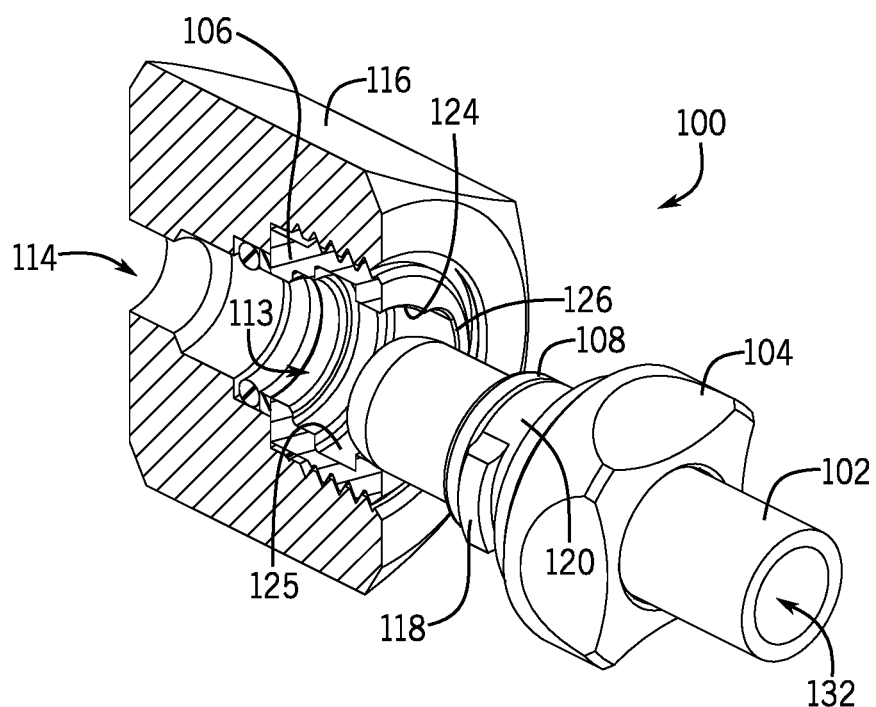
FIG. 3 is a partial cut-away view of the quick disconnect coupling of FIG. 2.

FIG. 2 is a partially exploded view of the coupling 100 prior to insertion of the swivel 104 into the bore 113 of the adapter 106, and FIG. 3 is a partial cut-away view of the coupling 100 illustrated in FIG. 2. In FIGS. 2 and 3, the adapter 106 is threaded into the receiving structure 116, and the swivel 104 is rotatably disposed on the tube 102. To fluidly connect the lumen 132 of the tube 102 with the port 114 (see FIG. 3) of the receiving structure 116, a user may rotate the swivel 104 about the tube 102 to align the at least one tab 118 with the at least one recess 126. In FIGS. 2 and 3, the at least one tab 118 is aligned with the at least one recess 126. After aligning the at least tab 118 with the at least one recess 126, the user may move the swivel 104 forwardly toward the adapter 106 and insert the at least one tab 118 through the at least one recess 126. The forward motion of the swivel 104 causes the tube 102 to move forwardly as well via an abutting engagement between the stem 120 of the swivel 104 and the retention shoulder 108 of the tube 102.

Figure 4:
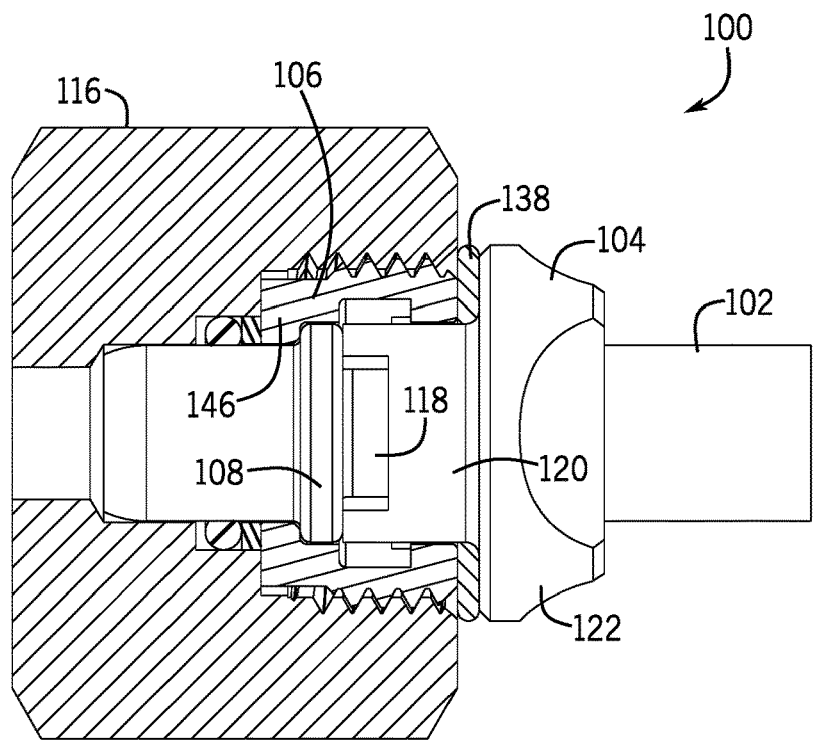
FIG. 4 is a partial cut-away view of the quick disconnect coupling of FIG. 1 with the swivel inserted into the adapter.

FIG. 4 is a partial cut-away view of the coupling 100 with the swivel 104 inserted into the adapter 106. In FIG. 4, the stem 120 of the swivel 104 is disposed at least partially inside the adapter 106 and the head 122 of the swivel 104 is disposed exterior of the adapter 106. A stop shoulder 146 of the adapter 106 may limit how far the tube 102 may be inserted into the adapter 106. For example, the retention shoulder 108 of the tube 102 may abut against the stop shoulder 146 of the adapter 106 to prevent further insertion of the swivel 104 into the adapter 106. When the swivel 104 is inserted into the adapter 106, the sealing element 138 may be compressed between the head 122 of the swivel 104 and the receiving structure 116, as illustrated in FIG. 4.

Figure 5:
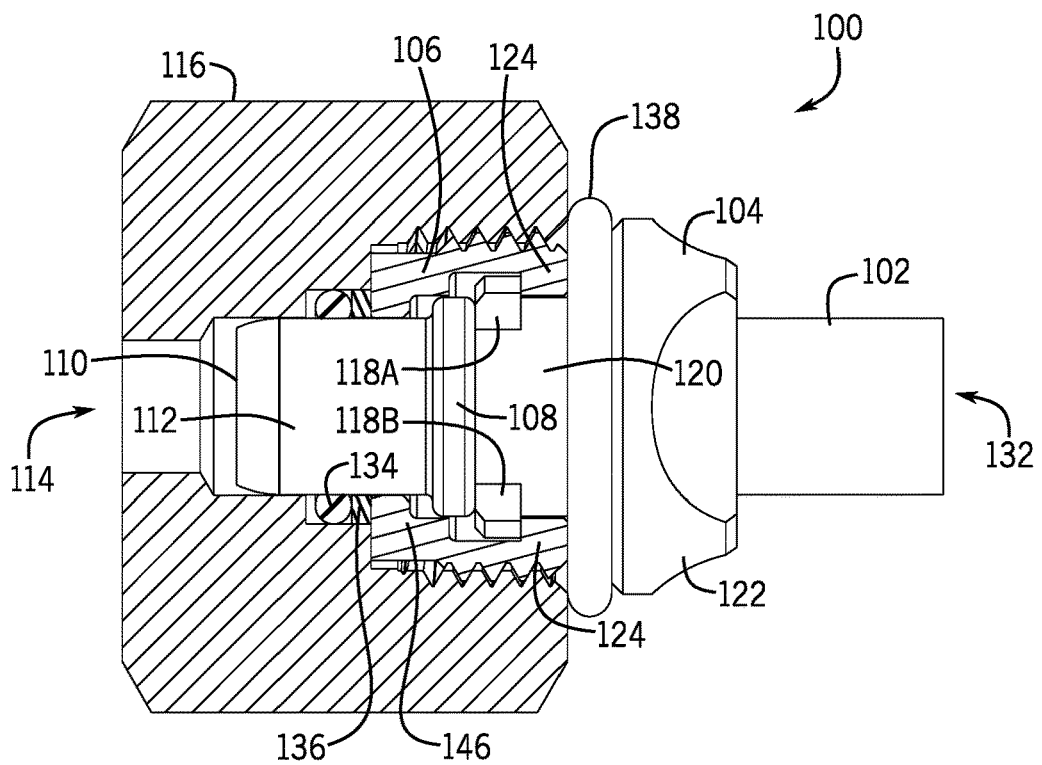
FIG. 5 is a partial cut-away view of the quick disconnect coupling of FIG. 4 with the swivel engaged with the adapter.

FIG. 5 is a partial cut-away view of the coupling 100 with the swivel 104 engaged with the adapter 106. In FIG. 5, the swivel 104 is rotated approximately a quarter turn (e.g., ninety degrees) relative to its position in FIG. 4 to misalign the at least one tab 118 with the at least one recess 126 (see FIG. 2). In this misaligned position, the internal flange 124 of the adapter 106 inhibits removal of the at least one tab 118 of the swivel 104. Additionally, the stem 120 abuts against the retention shoulder 108 of the tube 102 to inhibit disconnection of the tube 102 from the receiving structure 116, thereby maintaining fluid communication between the lumen 132 of the tube 102 and the port 114 of the receiving structure 116.

To maintain the swivel 104 in the rotational position illustrated in FIG. 5, the internal flange 124 may define an indentation for the at least one tab 118 to be seated in to ensure the swivel 104 does not rotate inadvertently relative to the adapter 106. When fluid is being transported between the port 114 of the receiving structure 116 and the lumen 132 of the tube 102, the fluid pressure may apply a biasing force to the swivel 104 through the retention shoulder 108 of the tube 102 to maintain the at least one tab 118 in engagement with the internal flange 124 of the adapter 106, such as seated in an indentation defined by the flange 124. Additionally or alternatively, the sealing element 138 may be resiliently compressed between the head 122 of the swivel 104 and the receiving structure 116 (and/or adapter) and may provide a force that biases the swivel 104 away from the adapter 106. The biasing force of the sealing element 138 may force the at least one tab 118 against or in engagement with the internal flange 124 such that the swivel 104 is not rotatable relative to the adapter 106 unless a user applies a sufficient external axial force to the swivel 104 to disengage the at least one tab 118 from the internal flange 124 followed by a rotational force to align the at least one tab 118 with the at least one recess 126 (see FIG. 2). The biasing force of the sealing element 138 may force the at least one tab 118 against or in engagement with the seat 127 (see FIG. 1) to inhibit relative rotation between the swivel 104 and the adapter 106. As illustrated in FIG. 5, the at least one tab 118 may project outwardly of the retention shoulder 108 when the swivel 104 is disposed on the tube 102. In FIG. 5, the at least one tab 118 is illustrated as including a first tab 118A and a second tab 118B diametrically opposed to each other about the stem 120 of the swivel 104. The first and second tabs 118A, 118B may be inserted through first and second recesses 126 of the adapter 106. The number and spatial positioning of the tabs 118 and recesses 126 may vary depending on the fluid application.

When the swivel 104 is engaged with the adapter 106, the end 110 of the tube 102 and at least a portion of the outer surface 112 of the tube 102 may be disposed inside the receiving structure 116 beyond the adapter 106. The sealing element 134 and the back-up ring 136 may be disposed inside the receiving structure 116 forward of the adapter 106. The sealing element 134 may sealingly engage the outer surface 112 of the tube 102 and an opposing inner surface of the receiving structure 116 to form a fluid-tight interface between the tube 102 and the receiving structure 116 forward of the adapter 106. As illustrated in FIG. 5, the adapter 106 may be disposed axially between the sealing elements 134, 138 to isolate the adapter 106 from fluid being transported between the port 114 and the lumen 132 and from foreign matter, such as dirt or debris. As also illustrated in FIG. 5, the retention shoulder 108 and the at least one tab 118 may be disposed inside of the adapter 106 when the swivel 104 is engaged with the adapter 106. The retention shoulder 108 of the tube 102 may be captured between the stop shoulder 146 of the adapter 106 and the stem 120 of the swivel 104 when the swivel 104 is engaged with the adapter 106 to restrict axial movement of the tube 102 relative to the receiving structure 116.

To couple the tube 102 to the receiving structure 116, the adapter 106 may be coupled (e.g., threaded) to the receiving structure 116. Then, the tube 102 may be inserted through the bore 113 of the adapter 106 into the port 114 of the receiving structure 116. To maintain the tube 102 in engagement with the receiving structure 116, the swivel 104 may be engaged with the adapter 106. Engagement of the swivel 104 with the adapter 106 may trap the retention shoulder 108 of the tube 102 between the swivel 104 and the adapter 106, thereby inhibiting axial movement of the tube 102 relative to the receiving structure 116 to maintain a fluid-tight engagement between the tube 102 and the receiving structure 116.

Figure 6:
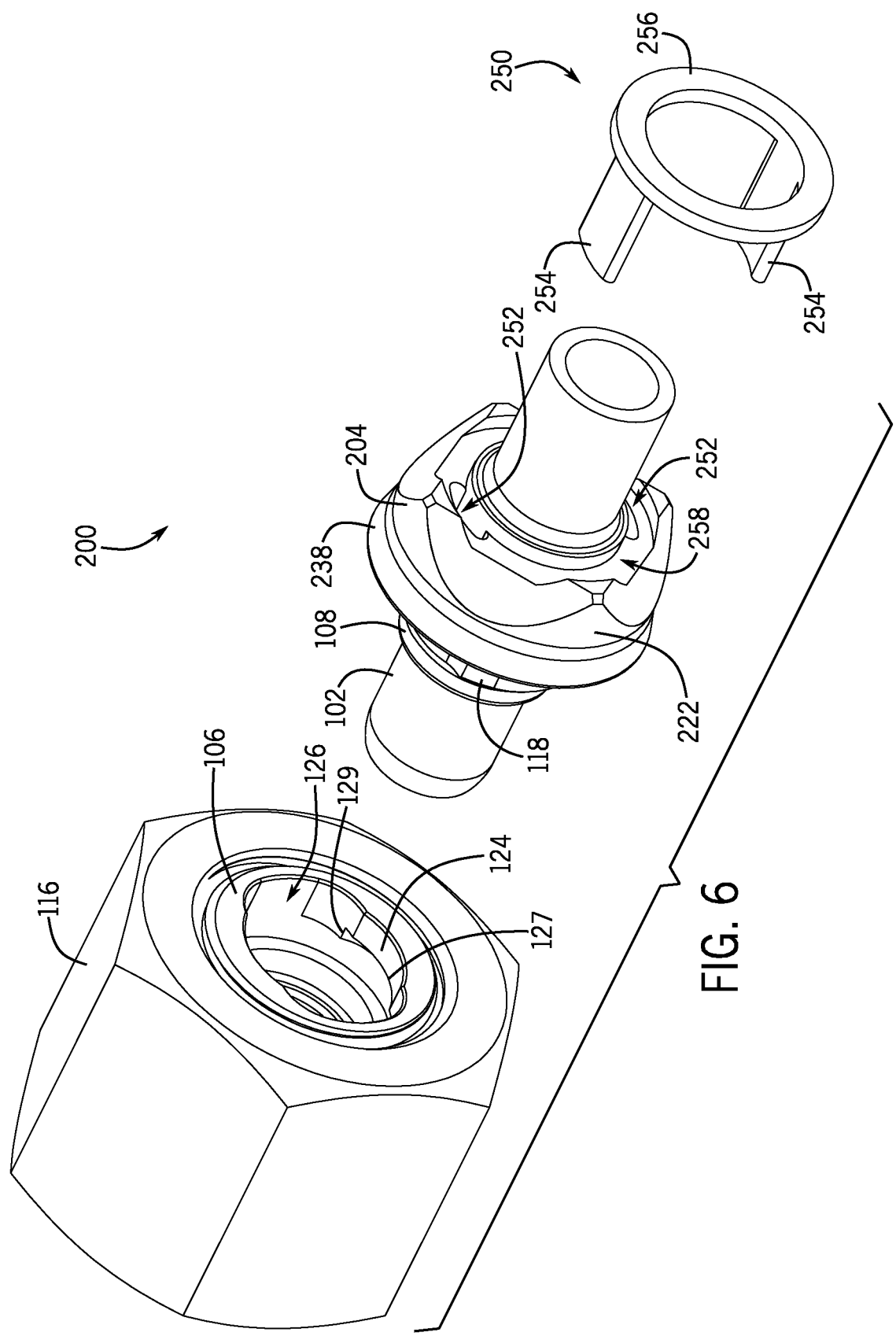
FIG. 6 is a partially exploded view of another example quick disconnect coupling.

FIG. 6 is a partially exploded view of another quick disconnect coupling 200. With the exception of the swivel 104 illustrated in FIGS. 1-5, the coupling 200 illustrated in FIGS. 6-10 has the same features and operation as the coupling 100. Accordingly, the preceding discussion of the features and operation of the coupling 100 illustrated in FIGS. 1-5 should be considered equally applicable to the coupling 200 illustrated in FIGS. 6-10, except as noted in the following discussion pertaining to the swivel 204 and a lock member 250. The reference numerals used in FIGS. 6-10 generally correspond to the reference numerals used in FIGS. 1-5 to reflect similar parts and attachments, except the first digit of each reference numeral associated with a modified part or feature is incremented by one.

The lock member 250 may be slidably disposed on the swivel 204. The swivel 204 may define at least one aperture 252 extending through the swivel 204 and dimensioned to receive at least one lock arm 254 of the lock member 250. The at least one aperture 252 may be rotationally offset from the at least one tab 118 such that when the at least one tab 118 is seated behind the internal flange 124 of the adapter 106, the at least one aperture 252 may be aligned with the at least one recess 126 to allow the at least one lock arm 254 to be inserted into the at least one recess 126 and inhibit rotation of the swivel 104 relative to the adapter 106. The at least one aperture 252 may be dimensioned to allow axial movement of the at least one lock arm 254 within the at least one aperture 252, but the at least one aperture 252 may be dimensioned to restrict lateral movement of the at least one lock arm 254 within the at least one aperture 252, thereby allowing axial movement of the lock member 250 relative to the swivel 204 but restricting rotational movement of the lock member 250 relative to the swivel 204. As illustrated in FIG. 6, the at least one aperture 252 may include two apertures 252 diametrically opposed from each other and arranged to receive two lock arms 254 diametrically opposed from each other on the lock member 250. The number and arrangement of apertures 252 and lock arms 254 may vary depending on the fluid application.

The lock member 250 may be seated on the swivel 204 and may include a base 256 to which the at least one lock arm 254 may be connected. The swivel 204 may define a groove 258 in the head 222 of the swivel 204, and the base 256 of the at least one lock arm 254 may be seated in the groove 258 when the at least one tab 254 is fully inserted into the at least one recess 126 of the adapter 106. As illustrated in FIG. 6, the base 256 may be formed as a ring; although the base 256 may be formed in other shapes. The size and arrangement of the at least one lock arm 254 and the base 256 may vary depending on the fluid application, including the arrangement of the adapter 106 and the swivel 204.

Figure 7:
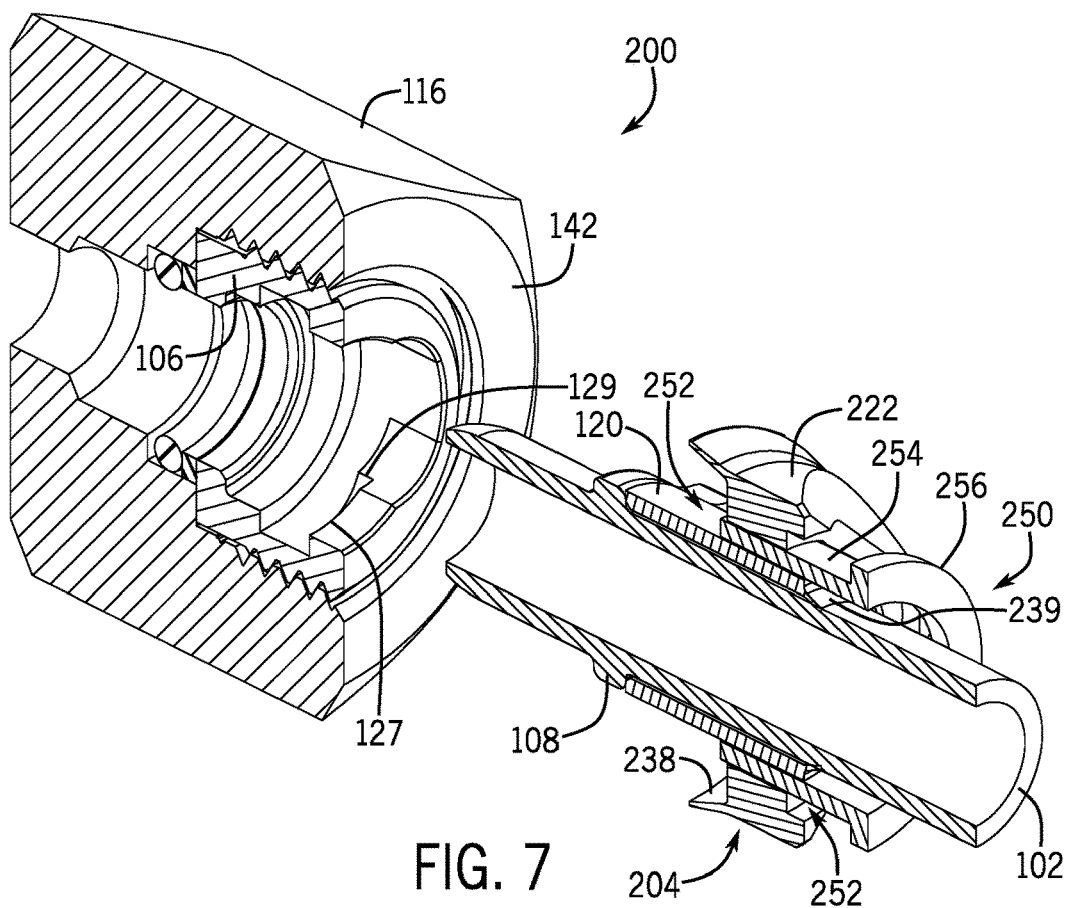
FIG. 7 is a cut-away view of the quick disconnect coupling of FIG. 6.

FIG. 7 is a cut-away view of the coupling 200 with the at least one lock arm 254 of the lock member 250 inserted into the at least one aperture 252 of the swivel 204. As illustrated in FIG. 7, the at least one lock arm 254 may extend through the at least one aperture 252 and may slide along an outer surface of the stem 120. The at least one lock arm 254 may slide along the stem 120 until the base 256 is seated in the groove 252 formed in the head 222. The stem 120 may be abutted against the retention shoulder 108 of the tube 102 to axially locate the swivel 204 along the length of the tube 102 during movement of the lock member 250 relative to the swivel 204.

As illustrated in FIGS. 6 and 7, a sealing element 238 may be formed as a part of the swivel 204 to keep foreign matter, such as dirt or debris, away from the at least one tab 118 of the swivel 204 and/or out of the interface between the adapter 106 and the receiving structure 116. The sealing element 238 may extend annularly around a peripheral edge of an underside of the head 222 to form a rim or shroud around the head 222. The sealing element 238 may be elastomeric and may be overmolded onto the head 222 of the swivel 204, which may be formed of a different material than the sealing element 238, such as a metal. The sealing element 238 may be sealingly engaged with the end face 142 of the receiving structure 116 when the swivel 204 is engaged with the adapter 106 to protect the threaded engagement of the adapter 106 and the receiving structure 116, and the at least one tab 118 of the swivel 204, from foreign matter.

As illustrated in FIG. 7, the swivel 204 may include a sealing element 239 to keep foreign matter, such as dirt or debris, out of the interface between the tube 102 and the swivel 204. The sealing element 239 may extend annularly around an inner edge of an upperside of the head 222 to form a rim or shroud around the tube 102 when the swivel 204 is disposed on the tube 102. The sealing element 239 may be elastomeric and may be overmolded onto the head 222 of the swivel 204, which may be formed of a different material than the sealing element 239. The sealing element 239 may be sealingly engaged with an outer surface of the tube 102 when the swivel 204 is engaged with the adapter 106 to protect the interface between the swivel 204 and the tube 102 from foreign matter.

Figure 8:
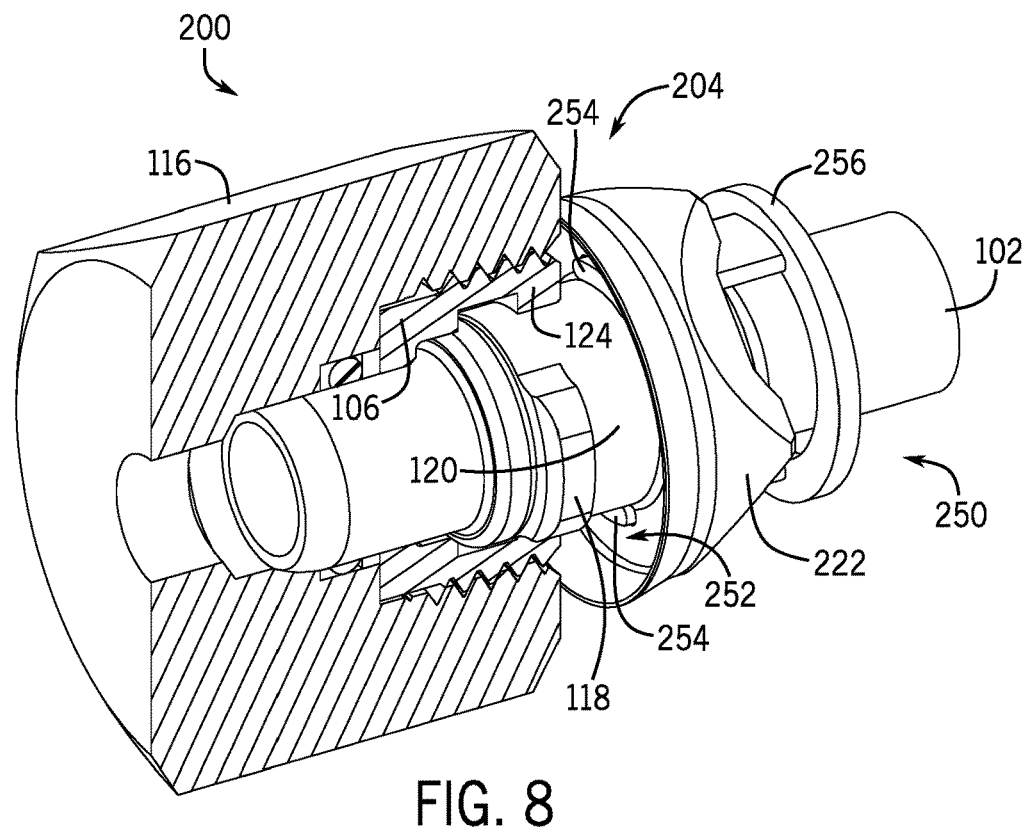
FIG. 8 is a partial cut-away view of the quick disconnect coupling of FIG. 6 with a swivel inserted into an adapter.

FIG. 8 is a partial cut-away view of the coupling 200 with the stem 120 of the swivel 204 at least partially inserted into the adapter 106. In FIG. 8, the at least one tab 118 has been inserted through the at least one recess 126 (see FIG. 6), but the swivel 204 has not been rotated relative to the adapter 106 to connect the swivel 204 to the adapter 106. In the illustrated rotational orientation of the swivel 204 in FIG. 8, the at least one lock arm 254 of the lock member 250 is misaligned with the at least one recess 126 (see FIG. 6) and the base 256 of the lock member 250 is spaced apart from the head 222 of the swivel 204. In FIG. 8, the at least one lock arm 254 is protruding from the at least one aperture 252 formed in the head 222 of the swivel 204, but the internal flange 124 of the adapter 106 blocks the path of the at least one lock arm 254 and thus inhibits the base 256 of the lock member 250 from being fully seated in the head 222 of the swivel 204.

Figure 9:
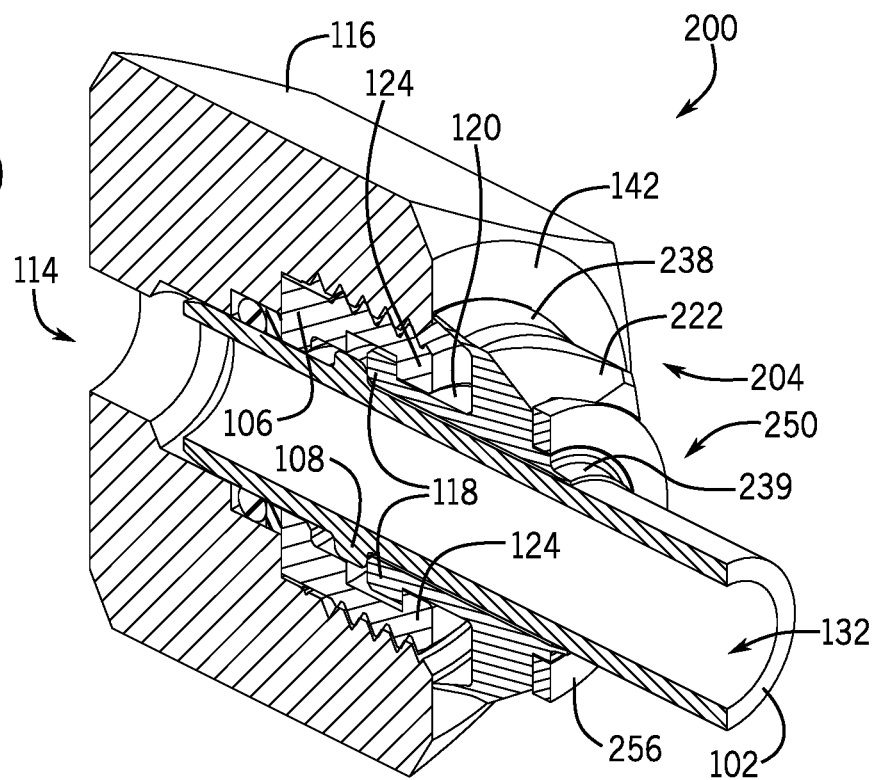
FIG. 9 is a partial cut-away view of the quick disconnect coupling of FIG. 7 with the swivel locked in engagement with the adapter.
Figure 10:
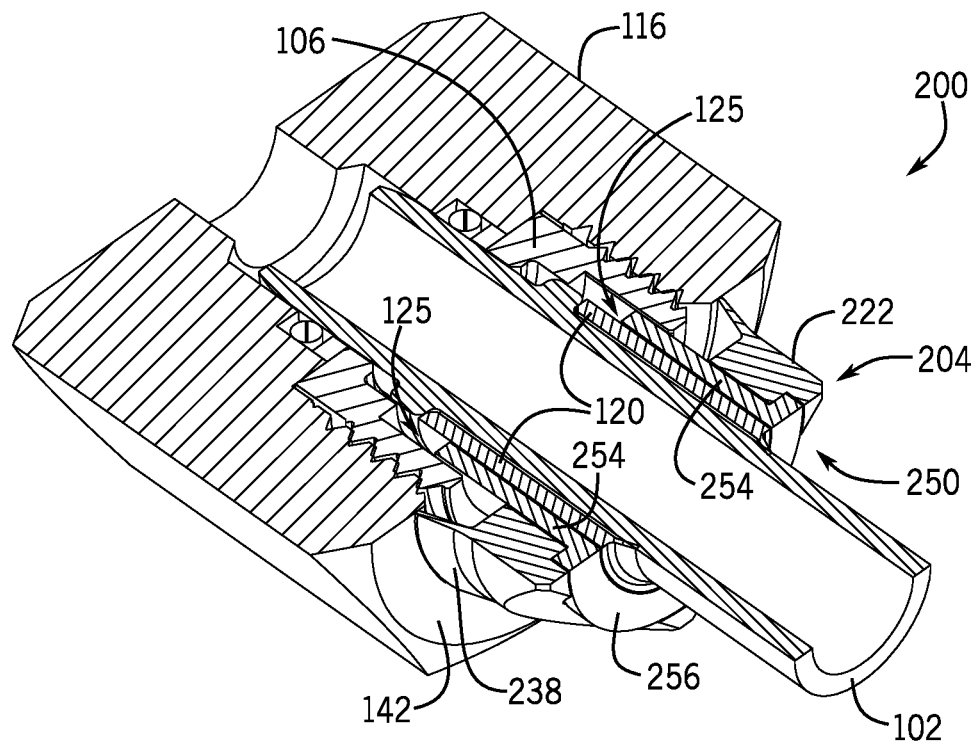
FIG. 10 is another partial cut-away view of the quick disconnect coupling of FIG. 7 with the swivel locked in engagement with the adapter.

FIGS. 9 and 10 are partial cut-away views of the coupling 200 with the swivel 204 in locked engagement with the adapter 106. To engage the swivel 204 with the adapter 106, the swivel 204 may be rotated relative to the adapter 106 about a quarter-turn (e.g., ninety degrees) relative to the rotational orientation of the swivel 204 illustrated in FIG. 8. As illustrated in FIG. 9, by rotating the swivel 204 relative to the adapter 106, the at least one tab 118 of the swivel 204 may be positioned forwardly of the internal flange 124 of the adapter 106 such that the flange 124 inhibits the swivel 204 from moving rearward out of engagement with the adapter 106. As previously discussed, the pressure of the fluid being transported between the receiving structure 116 and the tube 102 may be sufficient to maintain the at least one tab 118 in engagement with the internal flange 124. For example, the internal fluid pressure may bias the tube 102 and the receiving structure 116 away from each other, thereby causing the retention shoulder 108 formed on the tube 102 to apply an axial force to the swivel 204 that biases the at least one tab 118 into engagement with the internal flange 124, which may define at least one step 127 (see FIGS. 6 and 7) for receiving the at least one tab 118 when the swivel 204 is rotated into the engaged position illustrated in FIGS. 9 and 10. The biasing force of the sealing element 238 may force the at least one tab 118 against or in engagement with the seat 127 to inhibit relative rotation between the swivel 204 and the adapter 106. The internal flange 124 may define at least one stop shoulder 129 (see FIGS. 6 and 7) for inhibiting rotation of the at least one tab 118 in a disconnection direction relative to the adapter 106, thereby restricting inadvertent disconnection of the swivel 204 from the adapter 106

The lock member 250 may positively lock the swivel 204 to the adapter 106. When the swivel 204 is engaged with the adapter 106 (see FIG. 9), the lock member 250 may be slidable into the at least one recess 126 defined by the adapter 106 (see FIG. 10) to inhibit the swivel 204 from rotating relative to the adapter 106, thereby preventing the at least one tab 118 of the swivel 204 from disengaging the internal flange 124 of adapter 106. As illustrated in FIG. 10, the at least one arm 254 of the lock member 250 may be received in the at least one recess 126 of the adapter 106 when the lock member 250 is slid forwardly relative to the swivel 204 such that the base 256 is seated in the head 222 of the swivel 204. The at least one arm 254 of the lock member 250 may be dimensioned such that when received in the at least one recess 126 of the adapter 106, the at least one arm 254 may substantially occupy the at least one recess 126 and contacts the internal flange 124 defining the at least one recess 126, thereby inhibiting rotation of the lock member 250 relative to the adapter 106. In turn, the lock member 250 may inhibit rotation of the swivel 204 relative to the adapter 106 via the insertion of the at least one lock arm 254 through the at least one aperture 252 defined in the head 222 of the swivel 204 (see FIGS. 6 and 7) and into the at least one recess 126. In other words, insertion of the at least one lock arm 254 of the lock member 250 into the at least one recess 126 of the adapter 106 may inhibit rotation of the swivel 204 relative to the adapter 106, thereby ensuring the coupling 200 remains engaged and able to withstand pressure during fluid flow between the tube 102 and the receiving structure 116.

The lock member 250 may provide a visual indication of a proper connection between the swivel 204 and the adapter 106. For example, the base 256 of the lock member 250 may be fully seated in the head 222 of the swivel 204 when the at least one arm 254 of the lock member 250 is fully inserted into the at least one recess 126 of the adapter 106, thereby providing a visible indication to a user that the swivel 204 is fully engaged with the adapter 106 and locked in position. In other words, the lock member 250 may provide a visible safety indication to a user that the coupling 200 is engaged and able to withstand pressure.

FIG. 11 is an isometric view of an example lock member 350, and FIG. 12 is a section view of the lock member 350. Similar to the lock member 250 illustrated in FIGS. 6-10, the lock member 350 may include a base 356 and at least one lock arm 354 connected to the base 356. However, the at least one lock arm 354 illustrated in FIGS. 11 and 12 is slightly modified relative to the at least one lock arm 254 illustrated in FIGS. 6-10. For example, as illustrated in FIG. 12, the lock arm 354 may include a slot 362 extending lengthwise through a length of the lock arm 354 to form a resilient finger 364 offset laterally from a remaining portion 366 of the lock arm 354. The resilient finger 364 may include an angled barb 368 formed on a leading end of the resilient finger 364 to couple the lock member 350 with the swivel 204. The angled barb 368 may contact a portion of the swivel 204 during insertion of the lock arm 354 into the at least one aperture 252 of the swivel 204 (see FIGS. 6 and 7) to deflect the resilient finger 364 toward the remaining portion 366 of the lock arm 354. After the angled barb 368 passes by the portion of the swivel 204 defining at least one aperture 252, the resilient finger 364 may return to its original position substantially parallel to the remaining portion 366 of the lock arm 354, and the portion of the swivel 204 may be received in a space 370 defined between the angled barb 368 and a detent 372 formed on the resilient finger 364.

When the swivel 204 is oriented relative to the adapter 106 such that the at least one lock arm 354 of the lock member 350 is aligned with the at least one recess 126 of the adapter 106, the at least one lock arm 354 may be inserted into the at least one recess 126 to restrict the swivel 204 from being inadvertently rotated relative to the adapter 106 to disengage the swivel 204 from the adapter 106. When the at least one lock arm 354 is received in the at least one recess 126, the portion of the swivel 204 defining the at least one aperture 252 may be received in a space 374 defined between the detent 372 and base 356. The detent 372 may inhibit inadvertent removal of the at least one lock arm 354 from the at least one recess 126, and the base 356 may inhibit further insertion of the at least one lock arm 354 into the at least one recess 126.

Figure 13:
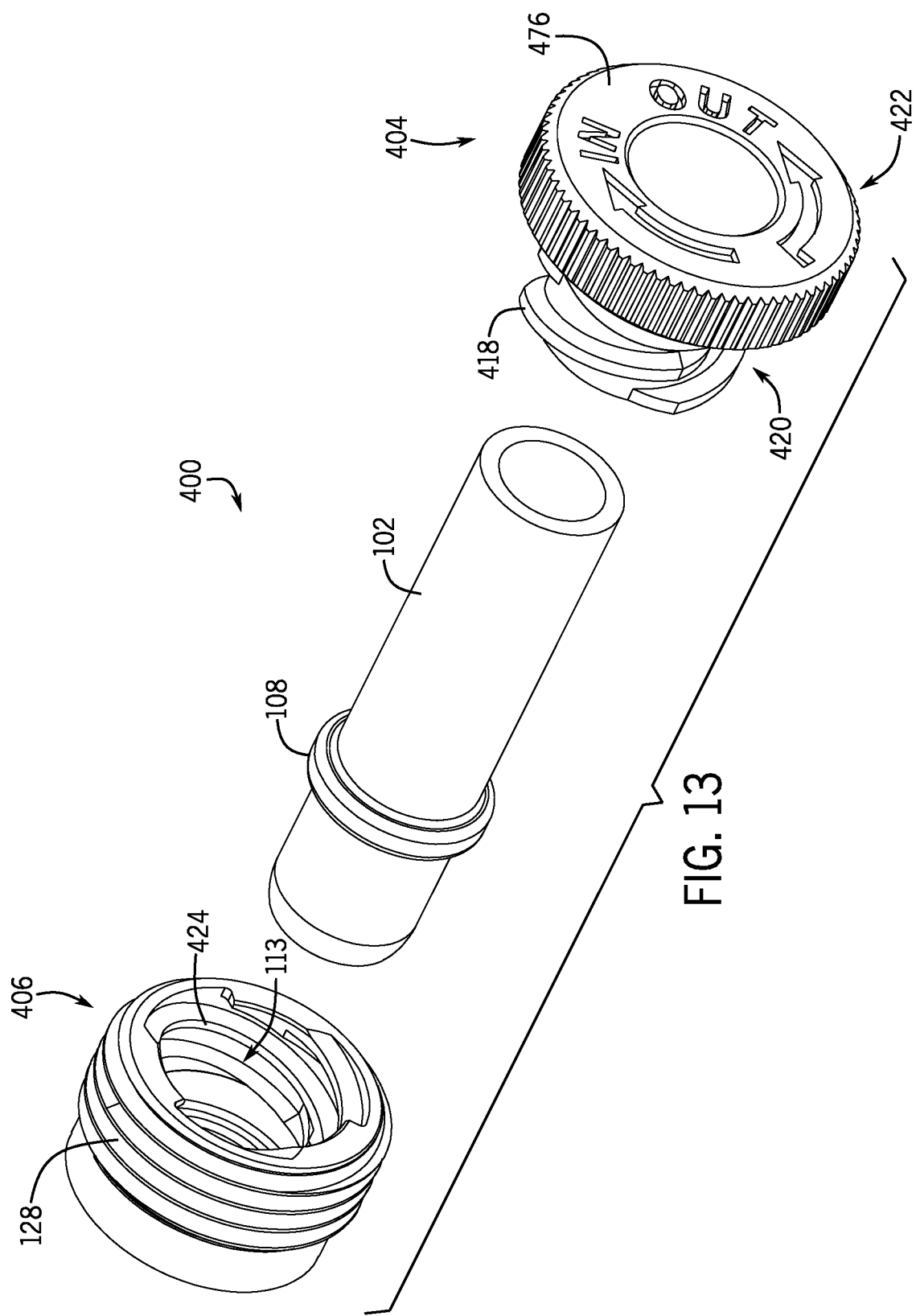
FIG. 13 is an exploded view of another example quick disconnect coupling.

FIG. 13 is an exploded view of another example quick disconnect coupling 400. With the exception of the swivel 104 and the swivel-connection-features of the adapter 106 illustrated in FIGS. 1-5, the coupling 400 illustrated in FIG. 13 has the same features and operation as the coupling 100. Accordingly, the preceding discussion of the features and operation of the coupling 100 illustrated in FIGS. 1-5 should be considered equally applicable to the coupling 400 illustrated in FIGS. 13-17, except as noted in the following discussion pertaining to the swivel 404 and the swivel-connection-features of the adapter 406. The reference numerals used in FIGS. 13-17 generally correspond to the reference numerals used in FIGS. 1-5 to reflect similar parts and attachments, except the first digit of each reference numeral associated with a modified part or feature is incremented by three.

Figure 14:
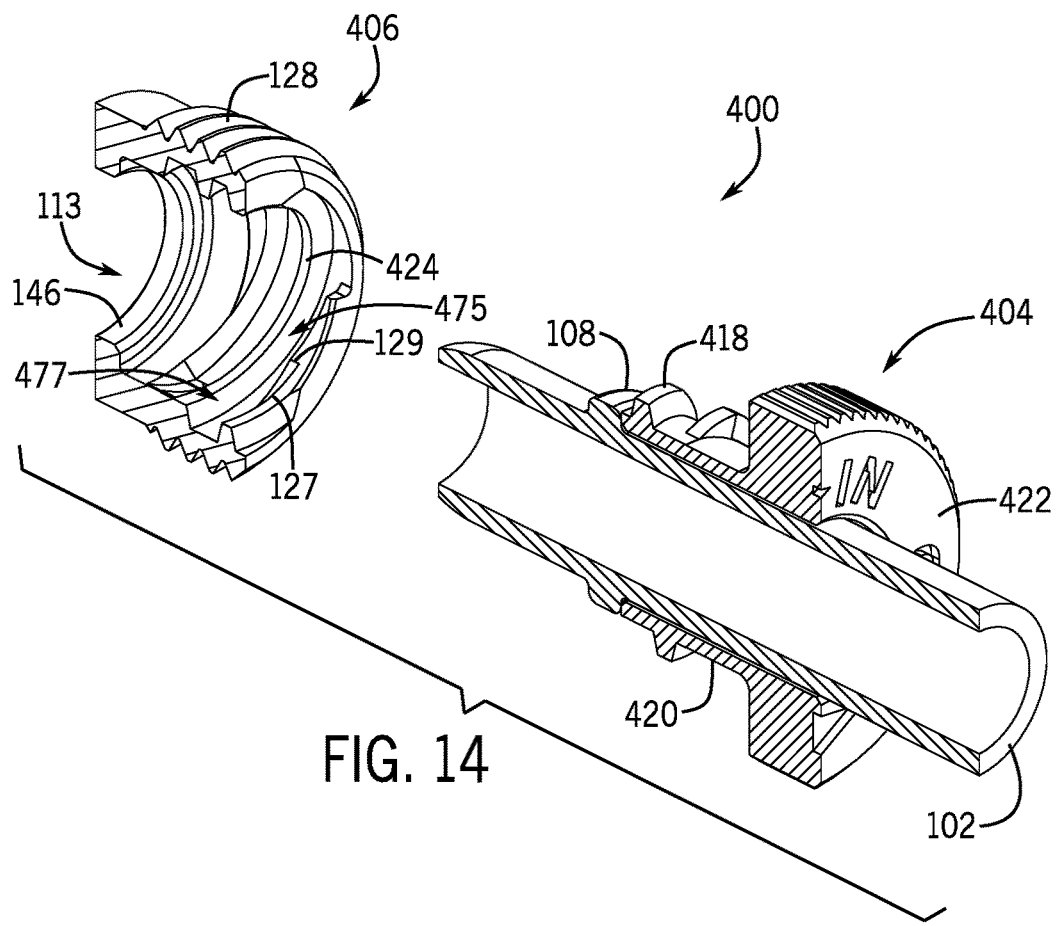
FIG. 14 is a partially exploded, cut-away view of the quick disconnect coupling of FIG. 13.

FIG. 14 is a partially exploded, cut-away view of the coupling 400. Referring to FIGS. 13 and 14, the coupling 400 may include a tube 102, a swivel 404, and an adapter 406. The swivel 404 may be rotatably disposed on the tube 102 and may be retained on the tube 102 by the retention shoulder 108 of the tube 102. The tube 102 may be at least partially received in a bore 113 of the adapter 406 for insertion into the port 114 of the receiving structure 116 (see, e.g., FIG. 1).

The swivel 404 and the adapter 406 may include corresponding engagement features for quick connection of the swivel 404 to the adapter 406. For example, the swivel 404 may include an external thread 418 that engages a corresponding internal thread 424 of the adapter 406 to connect the swivel 404 to the adapter 406. The external thread 418 may be formed on a stem 420 of the swivel 404, and the stem 420 may be connected to a head 422 of the swivel 404. The swivel 404 may be hand tightened to connect the swivel 404 to the adapter 406. The head 422 may include an engagement adaptation, such as knurling, to facilitate applying torque to the head 422 to engage or disengage the swivel 404 to or from the adapter 406. The head 422 may include surface treatment 476, such as informational text, to inform the user which direction to rotate the swivel 404 relative to the adapter 406 to either engage or disengage the swivel 404 with or from the adapter 406.

The adapter 406 may be connectable to the receiving structure 116 (see, e.g., FIG. 1). To connect the adapter 406 to the receiving structure 116, the adapter 406 may be threadedly engaged with the receiving structure 116. For example, the adapter 406 may include an external thread 128 that is engageable with the internal thread 130 of the receiving structure 116 to connect the adapter 406 to the receiving structure 116 (see, e.g., FIG. 1).

Referring to FIG. 14, the coupling 400 is illustrated prior to insertion of the swivel 404 into the bore 113 of the adapter 406. To fluidly connect the tube 102 with the port 114 of the receiving structure 116 (see FIG. 3), a user may insert the tube 102 into the bore 113 until the external thread 418 of the swivel 404 contacts the internal thread 424 of the adapter 406. Then, a user may rotate the swivel 404 about the tube 102 to threadedly engage the swivel 404 to the adapter 406.

Figure 15:
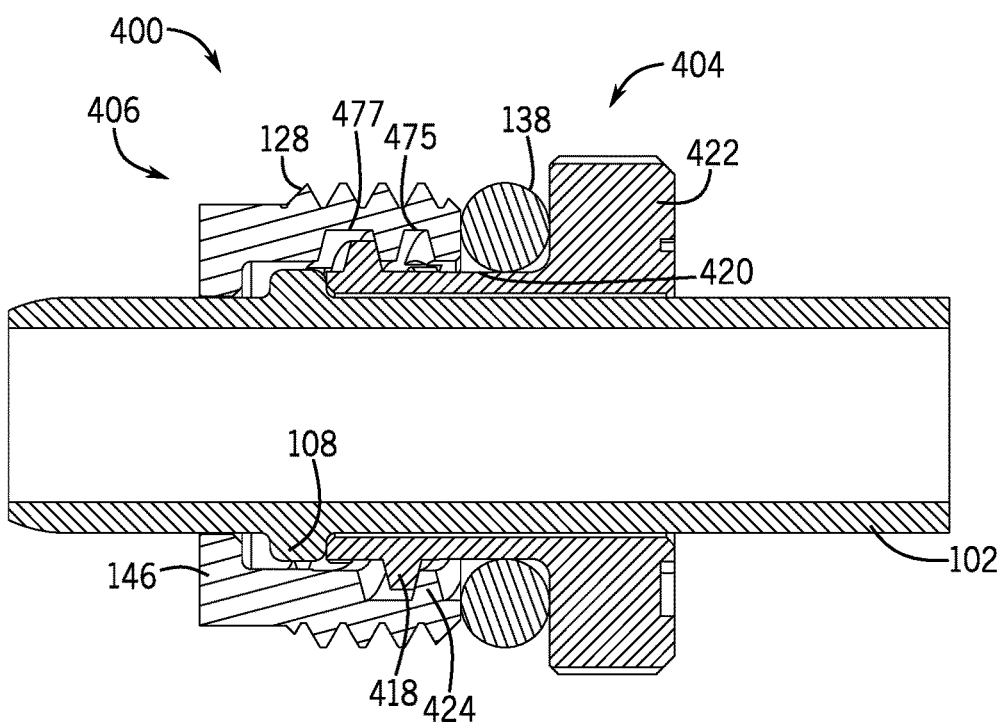
FIG. 15 is a cut-away view of the quick disconnect coupling of FIG. 13 with a swivel engaged with an adapter.

FIG. 15 is a cut-away view of the coupling 400 with the swivel 404 engaged with the adapter 406. When the swivel 404 is engaged with the adapter 406, a portion of the tube 102 may project beyond the adapter 406 for sealing engagement with the receiving structure 116 via a sealing element 134 (see, e.g., FIG. 1). The retention shoulder 108 may be captured between the swivel 404 and the adapter 406 when the swivel 404 is engaged with the adapter 406 to couple the tube 102 to the adapter 406 and thus the receiving structure 116. For example, the retention shoulder 108 of the tube 102 may be captured axially between a stop shoulder 146 of the adapter 406 and the stem 420 of the swivel 404 when the swivel 404 is engaged with the adapter 406 to positively locate the tube 102 relative to the receiving structure 116. To facilitate connection of the swivel 404 with the adapter 406, the external thread 418 of the swivel 404 may project outwardly of the retention shoulder 108 of the tube 102 for engagement with the internal thread 424 of the adapter 406, and the internal thread 424 may be dimensioned to engage the external thread 418 of the swivel 418 yet allow passage of the retention shoulder 108 of the tube 102. As illustrated in FIG. 15, when the swivel 404 is connected to the adapter 406, the stem 420 may be at least partially received inside the adapter 406, and the head 422 of the swivel 404 may be positioned external to the adapter 406. The stem 420 may abut against the retention shoulder 108 of the tube 102 to restrict axial movement of the tube 102 away from the receiving structure 116.

A seal 138 may be disposed on the stem 420 between the head 422 of the swivel 404 and the adapter 406. The seal 138 may be resiliently compressed between the head 422 of the swivel 404 and the adapter 406 and may provide a force that biases the swivel 404 away from the adapter 406. The biasing force of the seal 138 may ensure the external thread 418 of the stem 420 is guided into a seat 127 and against a stop shoulder 129 during unthreading of the swivel 404 from the adapter 406, thereby inhibiting inadvertent disconnection of the swivel 404 from the adapter 406. As illustrated in FIG. 14, the stop shoulder 129 may be formed in the internal thread 424 of the adapter 406. In some implementations, the external thread 418 may include a locking feature, such as a stop shoulder. The biasing force of the sealing element 138 may force the external thread 418 against or in engagement with the seat 127 such that the swivel 404 is not removable from the adapter 406 unless a user applies a sufficient external axial force to the swivel 404 to unseat the external thread 418 from the seat 127 followed by a rotational force to rotate the external thread 418 over the stop shoulder 129. As illustrated in FIGS. 14 and 15, the internal thread 424 of the adapter 406 may include a narrower root 475 at a starting portion of the thread 424 adjacent the stop shoulder 129 (due at least in part to the stop shoulder 129), and may include a wider root 477 after the stop shoulder 129. The external thread 418 of the swivel 404 may be dimensioned to slide within the narrower root 475 of the internal thread 424 such that the swivel 404 may be unthreaded and removed from the adapter 406 when the external thread 418 of the swivel 404 is aligned with the narrower root 475 of the internal thread 424 of the adapter 406.

Figure 16:
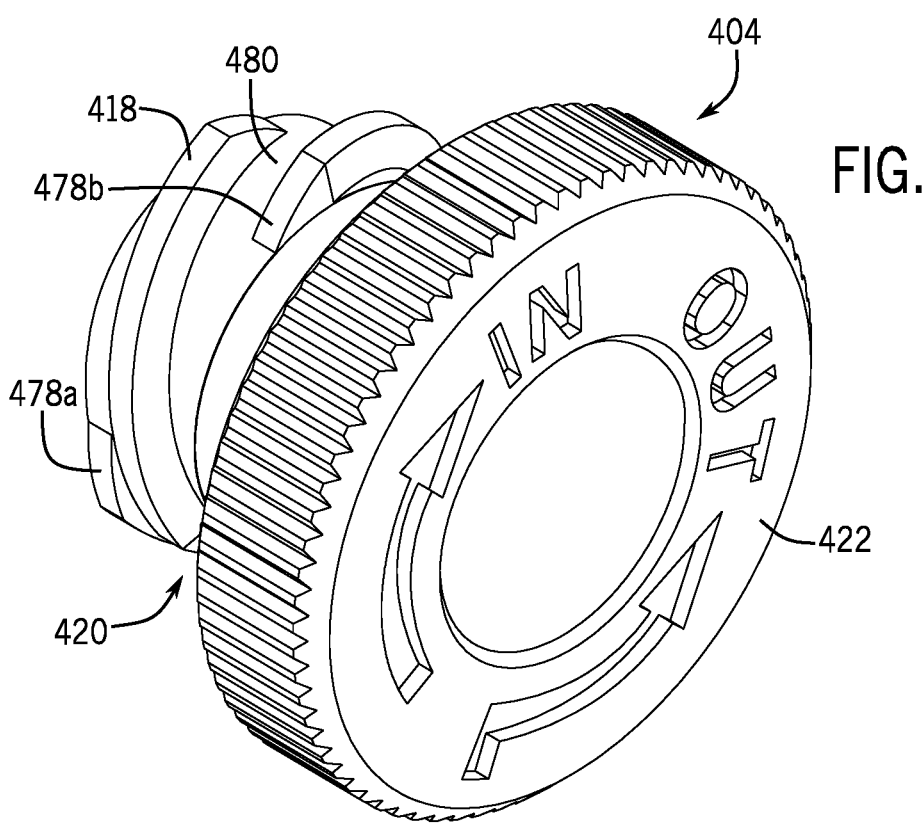
FIG. 16 is an isometric view of the swivel of the quick disconnect coupling of FIG. 13.
Figure 17:
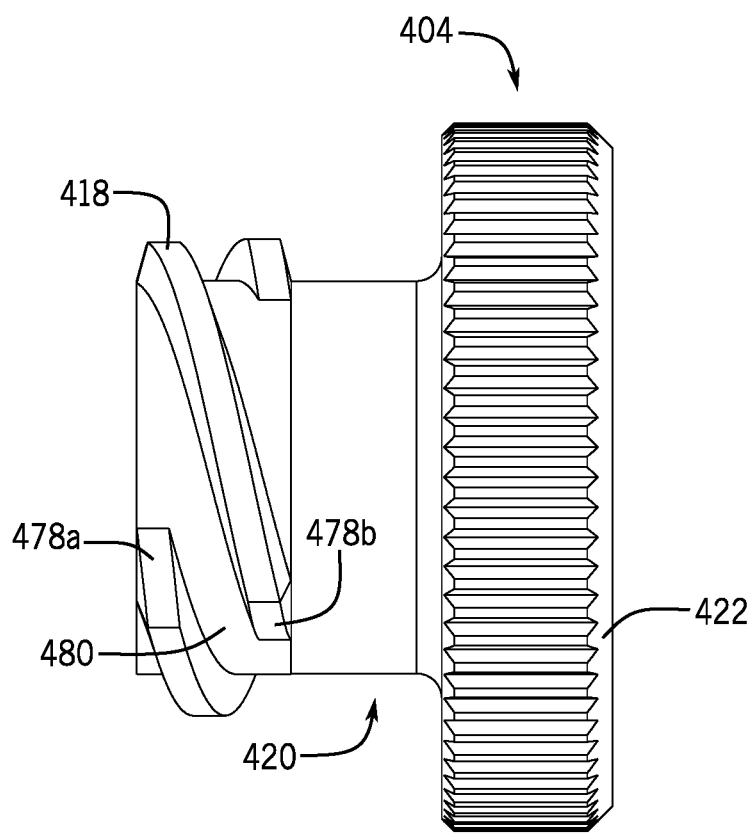
FIG. 17 is a side view of the swivel of the quick disconnect coupling of FIG. 13.

FIG. 16 is an isometric view of the swivel 404, and FIG. 17 is a side view of the swivel 404. The external thread 418 of the swivel 404 may include a modified thread start and termination to facilitate engagement of the external thread 418 with the internal thread 424 of the adapter 406 and to facilitate retention in the adapter 406. As depicted in FIGS. 16 and 17, the external thread 418 of the swivel 404 may include a Higbee flattened thread start 478a, which may make the thread easier to start (by reducing the tendency to cross-thread) and less susceptible to damage. The Higbee flat or flattened thread termination 478b may eliminate or substantially eliminate a sharp edge that may occur at a terminal end of a thread, and may enhance retention in the adapter 406 by engaging with, for example, the stop shoulder 129 (see FIG. 14). The Higbee flattened thread start 478a and/or termination 478b may be cut through the entire base of the thread or just flatten the sharp edge. With trapezoidal thread forms, such as an Acme thread form, the flat may be created at the width of the thread crest, such that it has a constant width running from the root to the crest of the thread. As illustrated in FIGS. 16 and 17, the width of the root 480 (i.e., the space between adjacent threads 418) is larger than the width of the crest (i.e., the width of the threads 418) by at least the distance that the swivel 404 moves when it is seated in the seat 127 of the adapter 406 (see FIG. 14) when the swivel 404 is fully tightened. The external thread 418 of the swivel 404 may include multiple thread starts (e.g., the external thread 418 is illustrated with three thread starts) for faster connection of the swivel 404 to the adapter 406. As illustrated in FIG. 17, the external thread 418 on the stem 420 of the swivel 404 may be offset from the head 422. The offset may provide a receiving space for a sealing element, such as the sealing element 138 illustrated in FIG. 15.

Referring generally to FIGS. 1-17, the engagement between the swivel 104, 204, 404 and the adapter 106, 406 may vary and may include, for example, at least one of an engagement between the tab 118 and the flange 124 or between the external thread 418 and the internal thread 424. When engaged together, the swivel 104, 204, 404 and the adapter 106, 406 may trap the retention shoulder 108 of the tube 102 between the swivel 104, 204, 404 and the adapter 106, 406, and the adapter 106, 406 may be coupled (e.g., threaded) to the receiving structure 116 to positively locate the tube 102 relative to the receiving structure 116. A first sealing feature, such as a sealing element 134, may form a seal between the tube 102 and the receiving structure 116 forward of the adapter 106, 406. A second sealing feature, such as sealing element 138, 238, may form a seal between the swivel 104, 204, 404 and the receiving structure 116 aft of the adapter 106, 406, thereby eliminating a seal between the adapter 106, 406 and the receiving structure 116. A third sealing feature, such as sealing element 239 (see FIGS. 7 and 9), may form a seal between the swivel 204 and the tube 102. Because the sealing element 134 between the tube 102 and the receiving structure 116 may form a seal between two cylindrical surfaces, the swivel 104, 204, 404 may not need a preload or torque load requiring the use of a tool, such as a wrench. Thus hand-tightening may be sufficient to fully engage the swivel 104, 204, 404 with the adapter 106, 406 and withstand the fluid pressure being transported between the tube 102 and the receiving structure 116.

A locking feature, such as locking member 250, 350, may positively lock the swivel 204 to the adapter 106 such that the swivel 204 is not disengageable from the adapter 106 without first removing the locking member 250, 350 from a recess 126 defined by the adapter 106. The locking member 250, 350 may provide a visual indication of a proper connection between the swivel 204 and the adapter 106 via the position of the base 256, 356 of the locking member 250, 350 relative to the head 222 of the swivel 204. The locking member 250, 350 may not be insertable into the recess 126 of the adapter 106 until the swivel 204 is fully engaged with the adapter 106, so visual inspection by a user may quickly identify whether a proper connection has been made.

In use, to connect the tube 102 to the receiving structure 116, the swivel 104, 204, 404 may be abutted against the retention shoulder 108 of the tube 102. A portion of the tube 102 may be inserted into the adapter 106, 406 such that the retention shoulder 108 is positioned between the swivel 104, 204, 404 and the adapter 106, 406. The swivel 104, 204, 404 may be engaged with the adapter 106, 406 by rotating the swivel 104, 204, 404 relative to the adapter 106, 406, thereby capturing the retention shoulder 108 between the swivel 104, 204, 404 and the adapter 106, 406. The adapter 106, 406 may be engaged with the receiving structure 116 prior to inserting the tube 102 into the adapter 106, 406. For example, the adapter 106, 406 may be threaded into the receiving structure 116. After the swivel 104, 204, 404 is engaged with the adapter 106, 406, the lock member 250, 350 may be slid along a length of the swivel 204 into the recess 126 defined by the adapter 106 to inhibit inadvertent rotation and thus disengagement of the swivel 204 relative to the adapter 106.

Figure 18:
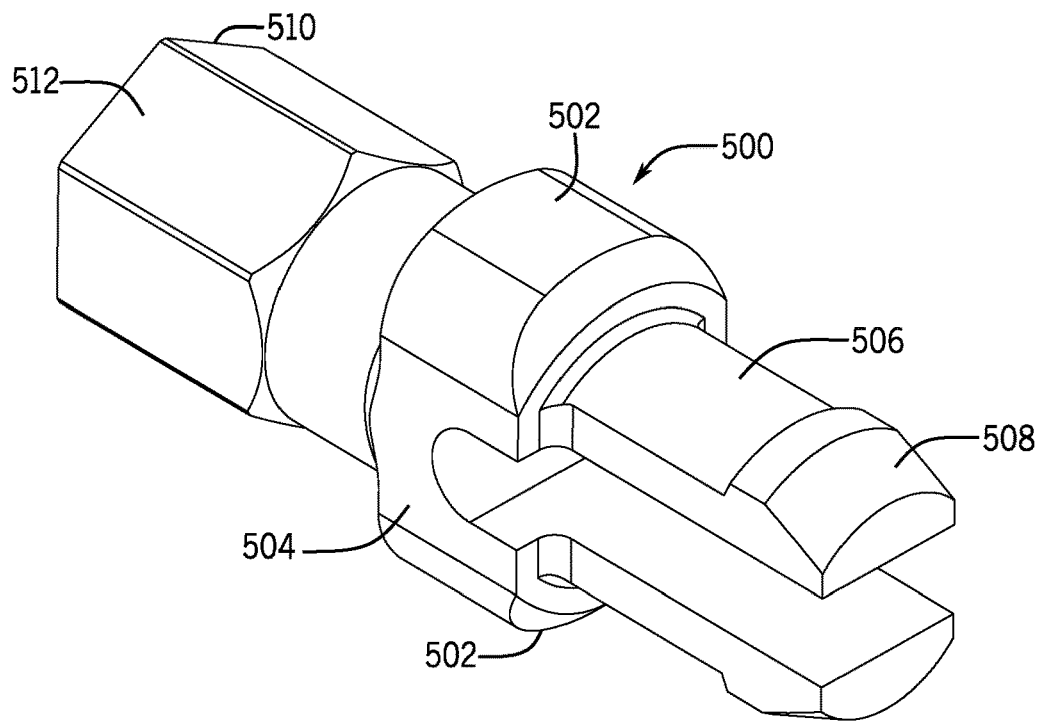
FIG. 18 is a front isometric view of a tool configured to insert an adapter into a receiving structure.
Figure 19:
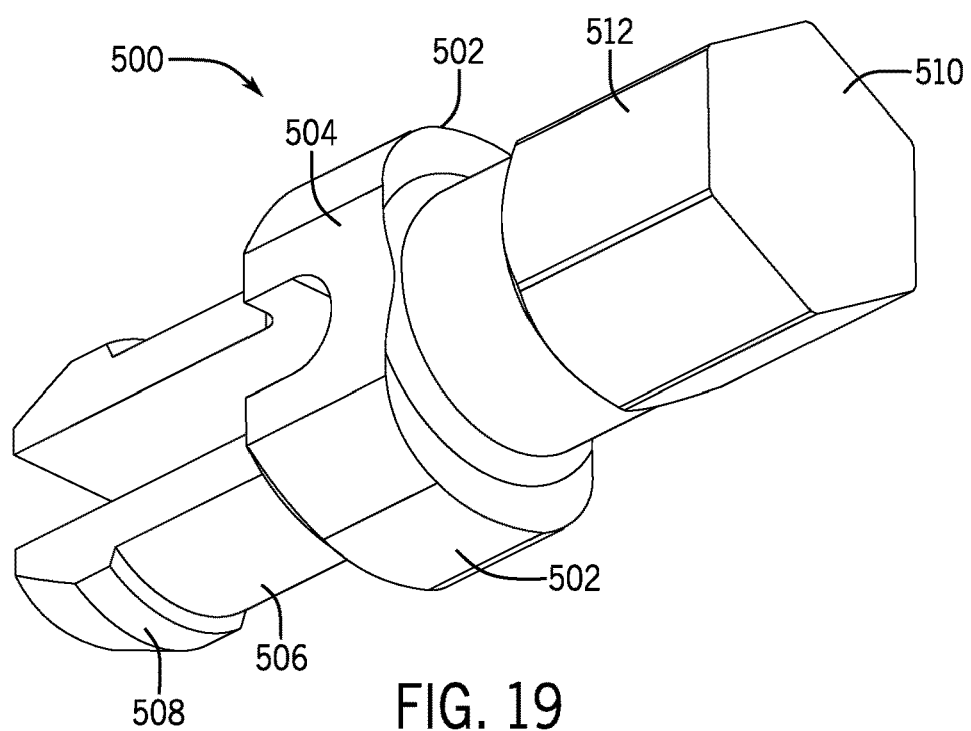
FIG. 19 is a rear isometric view of the tool of FIG. 18.

A tool may be used to facilitate installation of an adapter (e.g., adapter 106, 406) with a receiving structure (e.g., receiving structure 116). The tool may be used to install the adapter quickly in an off-line operation, and then the connection of the tube with the lumen can be done quickly by hand on the production line. FIGS. 18 and 19 illustrate an embodiment of a tool 500 configured to insert an adapter into a receiving structure. The tool 500 may be an elongate structure including at least one lobe 502 corresponding in geometry to the at least one recess 126 of the adapter 106, 406. As illustrated in FIGS. 18 and 19, the tool 500 may include a pair of lobes 502 diametrically opposed to each other about a body 504 of the tool 500. The lobes 502 may be inserted into the recesses 126 of the adapter 106, for example. The number and spatial positioning of the lobes 502 and recesses 126 may vary depending on the fluid application.

Referring still to FIGS. 18 and 19, the tool 500 may include two or more prongs 506 configured to engage the adapter 106, 406 such that the adapter 106, 406 is retained on the prongs 506. The prongs 506 may extend from one side of the body 504, and each prong 506 may include a barbed end 508. During insertion of the tool 500 into the adapter 106, 406, the prongs 506 may deflect inwardly toward each other until the adapter 106, 406 passes by the barbed ends 508 of the prongs 506, and then the prongs 506 may resiliently return to their nominal, non-deflected state to secure the adapter 106, 406 on the prongs 506 between the body 504 and their barbed ends 508. After the adapter 106, 406 is seated on the prongs 506, the tool 500 may be aligned with the receiving structure 116 such that the adapter 106, 406 is axially aligned with the port 114 defined by the receiving structure 116 (see, e.g., FIG. 1). To engage the adapter 106, 406 with the receiving structure 116, the tool 500 may be rotated about its longitudinal axis, and the rotation of the lobes 502 may cause corresponding rotation of the adapter 106, 406. In some implementations, the sealing element 134, the back-up ring 136, and the adapter 106 are pre-packaged such that when the tool 500 is inserted through the adapter 106, the tool 500 holds the sealing element 134, the back-up ring 136, and the adapter 106 together while being installed into the receiving structure 116. To facilitate rotation of the adapter 106, 406, the tool 500 may include an engagement feature 510. The engagement feature 510 may extend from an opposite side of the body 504 of the tool 500 relative to the prongs 506. In one embodiment, as illustrated in FIGS. 18 and 19, the engagement feature 510 may include circumferentially-arranged wrenching flats 512 configured for engagement by an impact wrench or drill, for example. In an off-line operation, the sealing element 134, the back-up ring 136, and the adapter 106 may be installed into the receiving structure 116 with a drill or impact wrench, for example. Then, the quick connect coupling can be installed via a quick connection by hand on the production line.

The quick disconnect couplings 100, 200, 400 may overcome many issues of other quick-disconnect couplings. For example, the couplings 100, 200, 400 may be direct-to-port capable. The couplings 100, 200, 400 may provide a fast and intuitive connection and disconnection. The couplings 100, 200, 400 may be formed onto tubing for low cost. The couplings 100, 200, 400 may provide a visual indication of a proper connection. The couplings 100, 200, 400 may use a small number of components. The couplings 100, 200, 400 may be used with an easily-machined port design. The couplings 100, 200, 400 may be connected and disconnected by hand. The couplings 100, 200, 400 may resist pressurized disconnection.

The foregoing description has broad application. Accordingly, the discussion of any example is meant only to be explanatory and is not intended to suggest that the scope of the disclosure, including the claims, is limited to these examples. In other words, while illustrative examples of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A quick disconnect coupling, comprising:
a tube including a retention shoulder;
a swivel rotatably disposed on the tube and retained on the tube by the retention shoulder, the swivel including at least one tab projecting outwardly of the retention shoulder; and
an adapter defining a bore for receiving the tube, the adapter including an internal flange dimensioned to allow passage of the retention shoulder and selective passage of the at least one tab depending on a rotational orientation of the swivel, wherein in a first rotational orientation of the swivel relative to the adapter the internal flange allows passage of the at least one tab, and wherein upon passage of the at least one tab the swivel is rotatable relative to the adapter to a second rotational orientation in which the swivel and the adapter are engaged together;
said coupling further comprising a structure defining a port, wherein the adapter is threaded into the structure; and wherein
the retention shoulder is offset from an end of the tube;
the tube includes an outer surface extending between the end of the tube and the retention shoulder;
the retention shoulder is disposed inside of the adapter; and
the end of the tube and at least part of the outer surface are disposed inside the structure beyond the adapter.

2. The quick disconnect coupling of claim 1, wherein in the second rotational orientation of the swivel the internal flange inhibits removal of the at least one tab from the adapter.

3. The quick disconnect coupling of claim 1, wherein the retention shoulder is positioned between the swivel and the adapter when the swivel is in the second rotational orientation.

4. The quick disconnect coupling of claim 1, wherein the internal flange defines at least one recess dimensioned to allow passage of the at least one tab.

5. The quick disconnect coupling of claim 4, wherein:
in the first rotational orientation, the at least one tab is aligned with the at least one recess; and
in the second rotational orientation, the at least one tab is misaligned with the at least one recess.

6. The quick disconnect coupling of claim 4, further comprising a lock member slidably disposed on the swivel.

7. The quick disconnect coupling of claim 6, wherein in the second rotational orientation of the swivel the lock member is slidable into the at least one recess to inhibit rotation of the swivel from the second rotation orientation to the first rotational orientation.

8. The quick disconnect coupling of claim 1, further comprising a sealing element disposed inside the structure and sealingly engaged with the outer surface of the tube and the structure to form a fluid-tight interface between the tube and the structure.

9. The quick disconnect coupling of claim 8, wherein the sealing element comprises a first sealing element, and further comprising a second sealing element disposed on the swivel and sealingly engaged with the swivel and an end face of the structure.

10. The quick disconnect coupling of claim 1, wherein:
the swivel further includes a head disposed exterior of the adapter and a stem disposed at least partially inside the adapter; and
the at least one tab is formed on the stem of the swivel.

11. The quick disconnect coupling of claim 10, further comprising a sealing element disposed on the stem of the swivel between the head and the adapter, wherein in the second rotational orientation of the swivel the sealing element is compressed and provides a force that biases the head of the swivel away from the adapter to maintain the swivel in the second rotational orientation.

12. A quick disconnect coupling, comprising:
a tube including a retention shoulder;
a swivel rotatably disposed on the tube and retained on the tube by the retention shoulder, the swivel including at least one tab projecting outwardly of the retention shoulder; and
an adapter defining a bore for receiving the tube, the adapter including an internal flange dimensioned to allow passage of the retention shoulder and selective passage of the at least one tab depending on a rotational orientation of the swivel, wherein in a first rotational orientation of the swivel relative to the adapter the internal flange allows passage of the at least one tab, and wherein upon passage of the at least one tab the swivel is rotatable relative to the adapter to a second rotational orientation in which the swivel and the adapter are engaged together;
said coupling further comprising:
a first sealing element disposed on the tube and arranged to form a seal between the tube and a receiving structure;
a second sealing element disposed on the swivel and arranged to form a seal between the swivel and the receiving structure; and
a third sealing element disposed on the swivel and arranged to form a seal between the swivel and the tube,
wherein the adapter is disposed axially between the first sealing element and the second sealing element.

13. A quick disconnect coupling, comprising:
a tube including a retention shoulder;
a swivel rotatably disposed on the tube and retained on the tube by the retention shoulder, the swivel including an external thread projecting outwardly of the retention shoulder; and
an adapter defining a bore for receiving the tube, the adapter including an internal thread dimensioned to threadedly engage the external thread of the swivel, wherein the retention shoulder is captured between the swivel and the adapter when the swivel and the adapter are threadedly engage;
said coupling further comprising a structure defining a port, wherein the adapter is threaded into the structure; and wherein the retention shoulder is offset from an end of the tube;
the tube includes an outer surface extending between the end of the tube and the retention shoulder;
the retention shoulder is disposed inside of the adapter; and the end of the tube and at least part of the outer surface are disposed inside the structure beyond the adapter.

14. The quick disconnect coupling of claim 13, wherein:
the swivel further includes a head disposed exterior of the adapter and a stem disposed at least partially inside the adapter;
the external thread is formed on the stem; and
the stem abuts against the retention shoulder.

15. The quick disconnect coupling of claim 13, wherein:
the adapter is externally threaded for threaded engagement with a structure defining a port; and
the internal thread of the adapter includes a locking feature that inhibits inadvertent disengagement of the swivel from the adapter.

* * * * *